United States Patent
Villani et al.

(10) Patent No.: US 9,601,972 B2
(45) Date of Patent: Mar. 21, 2017

(54) STATOR BAR CLIP ADAPTER FOR LIQUID COOLED DYNAMOELECTRIC DEVICE

(71) Applicant: General Electric Company, Schenectady, NY (US)

(72) Inventors: Michael Christopher Villani, Rensselaer, NY (US); Vance John Garguilo, Clifton Park, NY (US); John Anthony Petti, Schenectady, NY (US); Anthony Rigosu, Altamont, NY (US)

(73) Assignee: General Electric Company, Schenectady, NY (US)

( * ) Notice: Subject to any disclaimer, the term of this patent is extended or adjusted under 35 U.S.C. 154(b) by 507 days.

(21) Appl. No.: 14/179,774

(22) Filed: Feb. 13, 2014

(65) Prior Publication Data

US 2015/0229185 A1    Aug. 13, 2015

(51) Int. Cl.
*H02K 9/19* (2006.01)
*H02K 3/12* (2006.01)
*H02K 3/24* (2006.01)

(52) U.S. Cl.
CPC ............ *H02K 9/19* (2013.01); *H02K 3/12* (2013.01); *H02K 3/24* (2013.01)

(58) Field of Classification Search
CPC ...... H02K 9/19; H02K 15/00; H02K 15/0093; H02K 3/24; B23P 6/00
USPC .......................................................... 310/54
See application file for complete search history.

(56) References Cited

U.S. PATENT DOCUMENTS

| | | | | |
|---|---|---|---|---|
| 2,742,583 A | * | 4/1956 | Beckwith | H02K 3/505 174/15.3 |
| 3,131,321 A | * | 4/1964 | Willyoung | H02K 3/22 310/54 |
| 3,614,493 A | * | 10/1971 | Collings | H02K 3/22 310/54 |
| 4,274,021 A | * | 6/1981 | Kamiya | H02K 3/22 310/260 |
| 5,581,869 A | | 12/1996 | Travaly | |
| 5,605,590 A | | 2/1997 | Manning et al. | |
| 5,875,539 A | * | 3/1999 | Kilpatrick | H02K 3/505 228/119 |
| 6,763,563 B2 | | 7/2004 | Shanahan | |
| 6,895,653 B2 | | 5/2005 | Shanahan | |
| 7,202,579 B2 | * | 4/2007 | Kim | H02K 3/24 310/54 |
| 2004/0103532 A1 | | 6/2004 | Shanahan | |

* cited by examiner

*Primary Examiner* — Tran Nguyen
(74) *Attorney, Agent, or Firm* — Ernest G. Cusick; Hoffman Warnick LLC

(57) ABSTRACT

A stator bar clip adapter for a liquid cooled dynamoelectric device having a stator bar bottle clip coupled to a first stator bar and a stator bar leaf clip coupled to a second, same series-loop stator bar, and a related dynamoelectric device are disclosed. The stator bar clip adapter includes a bottle clip engaging member configured to engage a stator bar bottle clip; and a leaf clip engaging member coupled to the bottle clip engaging member and configured to engage a stator bar leaf clip.

18 Claims, 7 Drawing Sheets

STATOR BAR CLIP ADAPTER FOR LIQUID COOLED DYNAMOELECTRIC DEVICE

BACKGROUND OF THE INVENTION

The disclosure relates generally to liquid cooled dynamoelectric devices, and more particularly, to a stator bar clip adaptor therefor.

Dynamoelectric devices include a stator that interacts with a rotor to create either a generator or a motor. The dynamoelectric interaction of the stator and rotor oftentimes requires cooling, which may be provided in the form of a liquid (e.g., a water-based coolant). Stators typically include a number of stator laminates that are coupled together. In order to provide the necessary liquid flow to the stator laminates for cooling, a stator bar clip is provided at the ends of the laminates. The stator bar clip holds the laminates together and provides a mechanism to deliver cooling liquid thereto. Stator bar clips take two predominate forms, depending on the form of stator laminates, referred to as bottle clips and leaf clips.

Referring to FIG. 1, a perspective view of a prior art liquid cooled dynamoelectric device 10 using stator bar bottle clips 12 is shown in a partially disassembled state. Stator bar bottle clips 12 include a stator bar coupling portion 14 that encloses the laminates (therein) of a stator bar (typically polygonal in shape) and is fluidly coupled to a port 16 (typically round in shape) that provides the cooling liquid to the stator laminates via piping 18 fluidly coupled to the rounded portion. Piping 18 also electrically couples adjacent bottle clips, e.g., 12A, 12B, to form the necessary electrical connections therebetween. Thus, bottle clips allow electrical connection to the stator laminates and liquid connection for cooling. As shown in FIG. 2, stator bar leaf clips 30 include a stator bar coupling portion 32 (typically polygonal) that encloses the stator laminates (therein) with a port 34 (typically round in shape) for liquid connection via piping for delivering a cooling liquid. A plurality of leafs 36 extend from stator bar coupling portion 32 and are bent to be interposed with an adjacent leaf clip's leafs to make an electrical connection with an adjacent leaf clip, e.g., 30A, 30B, and therefore the adjacent stator windings that require electrical connection.

As observed by comparing FIGS. 1 and 2, a dynamoelectric device is typically constructed with windings that accommodate either stator bar bottle clips or stator bar leaf clips, i.e., their use is mutually exclusive. Changing the type of clip typically requires rewinding the stator to change the configuration of stator bar laminates.

When a dynamoelectric device requires maintenance, its operation must stop so the system can be taken apart. Consequently, it is advantageous to minimize outage time as much as possible. For example, in terms of a generator, no electricity is generated during this time, so minimizing outage time is very advantageous. The need to minimize down time is especially important during a forced outage, e.g., when the device must stop for repair as opposed to a scheduled outage.

One challenge in minimizing outage time is that some repair and/or maintenance work requires removal of the stator bar clips. The stator bar clips can be removed by heating to reflow the brazing that holds them in place, or by cutting them. Regardless of technique used, the removed stator bar clips are usually dirty, which creates contamination issues when the clips must be re-brazed for re-installation. Cutting an end of the clip to remove the clip is typically impractical because, while it eliminates the contaminated copper and would allow contaminant-free re-brazing, it changes the overall length of the stator bar. In addition to the above-described challenges, the fact that the same type of stator bar clip must be used within a particular dynamoelectric device limits repair/maintenance options. For example, where a leaf clip type system is being repaired, only leaf clips can be reinstalled unless a very expensive and time consuming re-winding of the system to change the type of stator laminate configuration is performed. Similarly, where a bottle clip system is being repaired, only bottle clips can currently be used.

BRIEF DESCRIPTION OF THE INVENTION

A first aspect of the disclosure provides a stator bar clip adapter for a liquid cooled dynamoelectric device having a stator bar bottle clip coupled to a first stator bar and a stator bar leaf clip coupled to a second, same series-loop stator bar, the adapter comprising: a bottle clip engaging member configured to engage the stator bar bottle clip; and a leaf clip engaging member coupled to the bottle clip engaging member and configured to engage the stator bar leaf clip.

A second aspect of the disclosure provides a stator bar clip adapter comprising: a bottle clip engaging member including a collar having an inner diameter configured for sliding engagement about an outer diameter of a stator bar bottle clip coupled to a first stator bar; and a leaf clip engaging member configured to engage a stator bar leaf clip coupled to a second, adjacent stator bar, the leaf clip engaging member including: a base coupled to the bottle clip engaging member, and a plurality of leaf members extending from the base and configured for intermeshing engagement with a plurality of leafs of the stator bar leaf clip.

A third aspect of the disclosure provides a liquid cooled dynamoelectric device comprising: a first stator bar; a stator bar bottle clip coupled to an end of the first stator bar; a second, adjacent stator bar; a stator bar leaf clip coupled to an end of the second, adjacent stator bar; and a stator bar clip adapter coupling the stator bar bottle clip to the stator bar leaf clip.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 3:
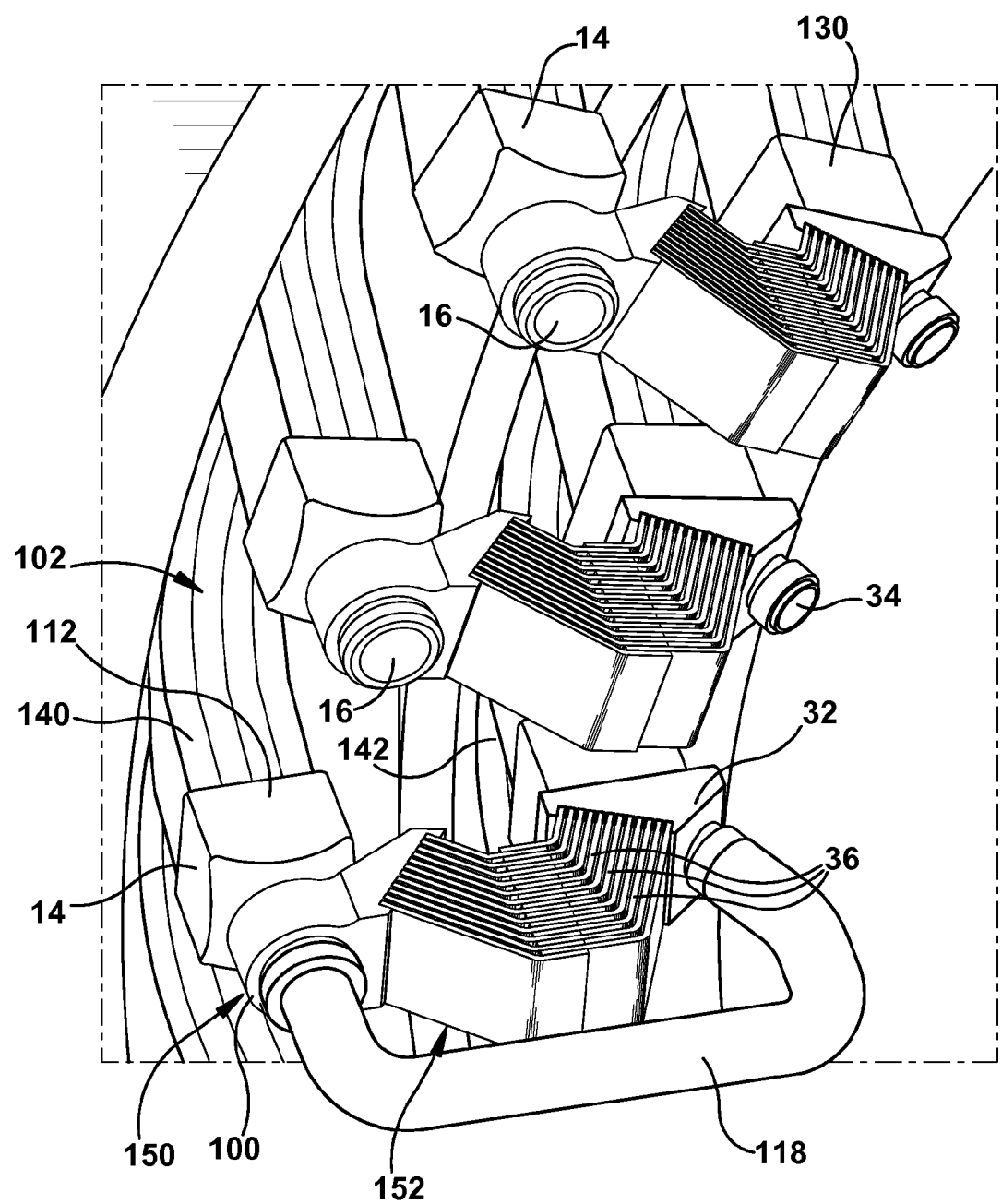
FIG. 3 shows an end view of a dynamoelectric device using a stator bar clip adapter according to embodiments of the invention.

As indicated above and as shown in FIGS. 3-7, the disclosure provides a stator bar clip adapter 100 for a liquid cooled dynamoelectric device 102. As shown in FIG. 3, dynamoelectric device 102 includes a stator bar bottle clip 112 coupled to a first stator bar 140 and a stator bar leaf clip 130 coupled to a second adjacent stator bar 142 that is in the same series-loop as first stator bar 140. Hence, dynamoelectric device 102, in contrast to typical devices, is using different types of stator bar clips 112, 130 together. In one embodiment, stator bars 140, 142 of dynamoelectric device 102 are originally structured to accommodate stator bar leaf clips 130, i.e., all of the clips are leaf clips. However, during repairs, as shown in FIG. 3, certain, original stator bar leaf clips 130 may be removed and replaced with stator bar bottle clips 112, and adapter 100, as will be described in greater detail herein, allows coupling of stator bar bottle clips 112 and stator bar leaf clips 130 within a single dynamoelectric device. It is emphasized, however, that the teachings of the disclosure are not limited to dynamoelectric devices that are originally configured for stator bar leaf clips 130 as the adapter 100 described herein is equally applicable to a dynamoelectric device that is originally structured to accommodate stator bar bottle clips 112. In this case, during repairs, as shown in FIG. 3, certain, original, stator bar bottle clips 112 may be removed and replaced with stator bar leaf clips 130, and adapter 100 couples each type to the other type. As noted, use of adapter 100 allows use of both types of stator bar clips within a single dynamoelectric device regardless of what type of clip the device's stator bars are originally designed to accommodate.

Figure 1:
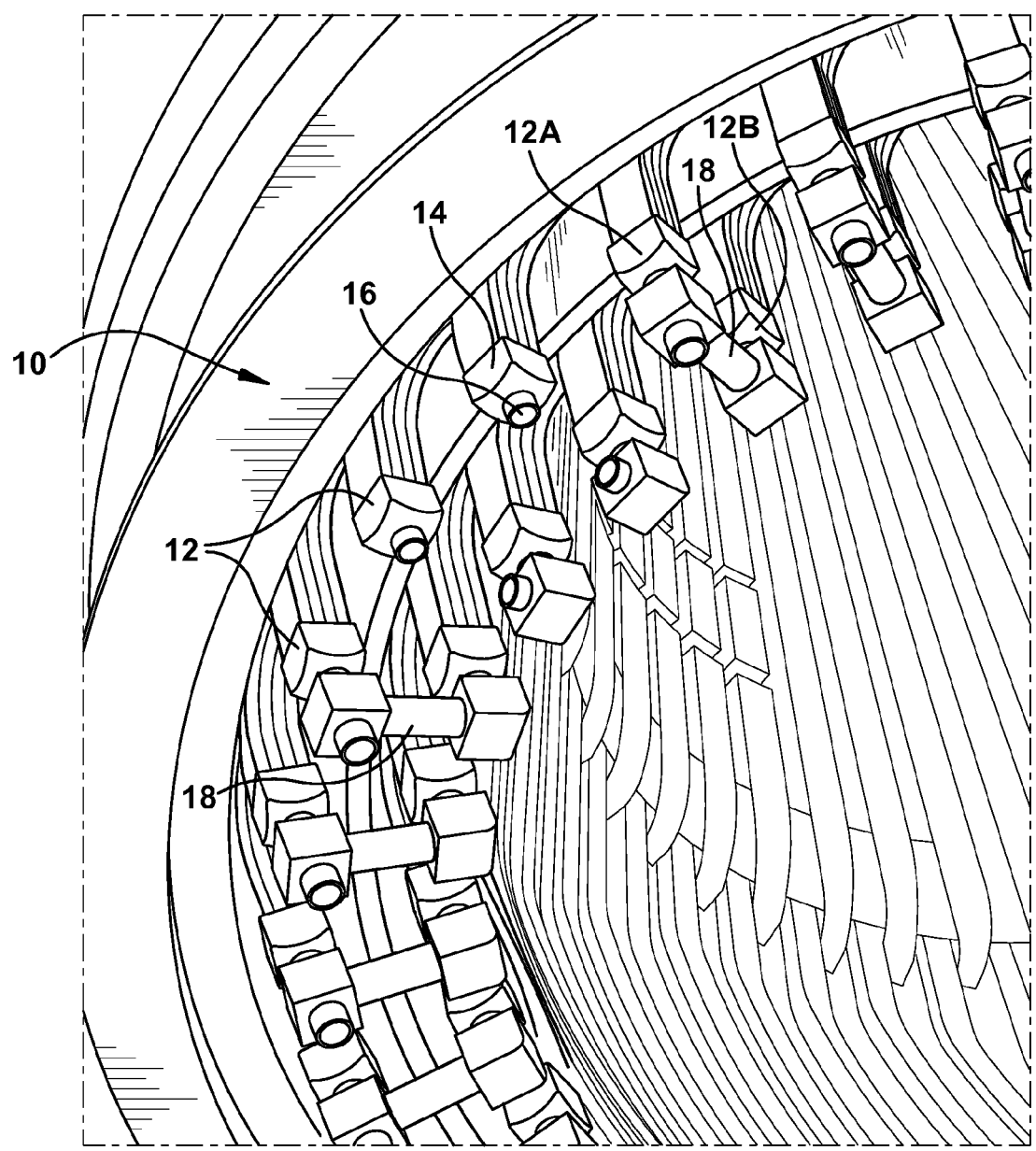
FIG. 1 shows a prior art liquid cooled dynamoelectric device using stator bar bottle clips.

With further regard to the clips illustrated, in one embodiment, stator bar bottle clip 112 is substantially identical to that described relative to FIG. 1, i.e., it is a typical bottle clip device, and is simply coupled with first stator bar 140 in a typical fashion even though the stator bar was originally structured to accommodate a stator bar leaf clip 130. That is, stator bar bottle clip 112 may include an unmodified stator bar coupling portion 14 that encloses the laminates (therein) of first stator bar 140 even though the bar was constructed to receive a leaf clip. In an alternative embodiment, stator bar bottle clip 112 may have minor changes in dimensions of stator bar coupling portion 14 to accommodate first stator bar 140. That is, stator bar bottle clip 112 may be configured (e.g., sized, shaped) to accommodate first stator bar 140, which may have been originally configured to accommodate a leaf clip 130. In any event, as described herein, stator bar coupling portion 14 of bottle clip 112 is fluidly coupled to port 16 that provides the cooling liquid to the stator laminates via piping 118 that is fluidly coupled to the port.

Figure 2:
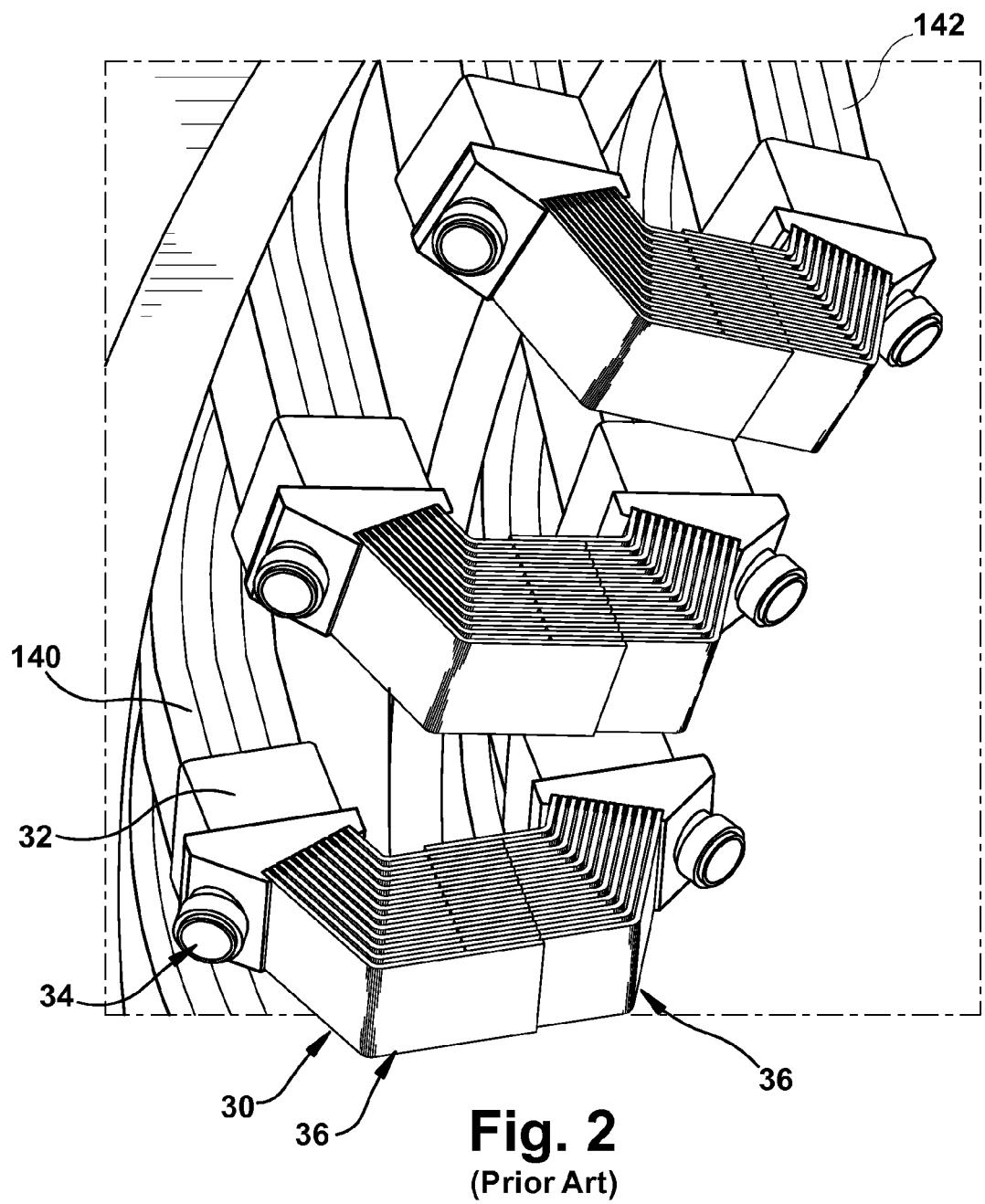
FIG. 2 shows a prior art liquid cooled dynamoelectric device using stator bar leaf clips.

Similarly, in one embodiment, stator bar leaf clips 130 are substantially identical to that described relative to FIG. 2, i.e., it is a typical leaf clip device. As described relative to FIG. 2, leaf clip 130 may include an unmodified stator bar coupling portion 32 that encloses the stator laminates (therein) of second stator bar 142, which may have been originally configured (e.g., sized, shaped) to accommodate bottle clips 112. As with the bottle clips 112, in alternative embodiment, leaf clips 130 may have their stator bar coupling portions 32 configured (e.g., sized, shaped) to accommodate second stator bar 142 that was originally structured to accommodate bottle clips 112. In any event, leaf clips 130 include port 34 for liquid connection for delivering a cooling liquid, and a plurality of leafs 36 that extend from stator bar coupling portion 32 for electrical connection to an adjacent leaf clip in a typical manner or adapter 100, as will be described.

Referring to FIGS. 3-7, adapter 100 may include a bottle clip engaging member 150 configured to engage stator bar bottle clip 112, and a leaf clip engaging member 152 coupled to bottle clip engaging member 150 and configured to engage stator bar leaf clip 130. Hence, adapter 100 couples one type of stator bar clip to another type within a single dynamoelectric device 102 (FIG. 3). The stator bar clips 112, 130 coupled by adapter 100 are coupled to stator bars on the same series loop within device 102. Depending on need, adapters 100 may be used on selective adjacent pairs of same series loop stator bars, or on all adjacent pairs, within device 102. Adapter 100 may be made of any material capable of coupling to stator bar clips 112, 130. In one embodiment, adapter 100 is made of copper or alloys thereof, and may be made using any now known or later developed manufacturing techniques such as machining, brazing, etc. Any now known or later developed stress relief structures may be used to ensure the robustness of adapter 100.

Turning to the details of adapter 100, in one embodiment, bottle clip engaging member 150 may include a collar 154 having an inner diameter ID configured for sliding engagement about an outer diameter OD (FIG. 7 only) of stator bar bottle clip 112, i.e., about port 16. Collar 154 is sized such that, in a seated position, shown in FIGS. 4-7, stator bar bottle clip 112 extends through collar 154 allowing piping 118 (FIG. 3) to connect to the stator bar bottle clip. That is, as shown in FIG. 3, port 16 of stator bar bottle clip 112 is accessible even though adapter 100 is thereon such that piping 118 can be coupled to port 16 to provide liquid coolant. Piping 118 may be coupled to port 16 in any now known or later developed manner, e.g., brazing. Collar 154 is brazed to port 16 using any now known or later developed brazing compound, and may include a braze ring 156 (FIG. 4 only) of suitable material therein for engaging outer diameter OD (FIG. 7 only) of the port. Collar 154 may take any shape necessary for sliding engagement with port 16.

Although not shown, in an alternative embodiment, collar 154 could be replaced with a male coupling configured to seat within port 16. In this case, the male coupling would have to provide a port of its own for fluid connection to piping 118.

Figure 4:
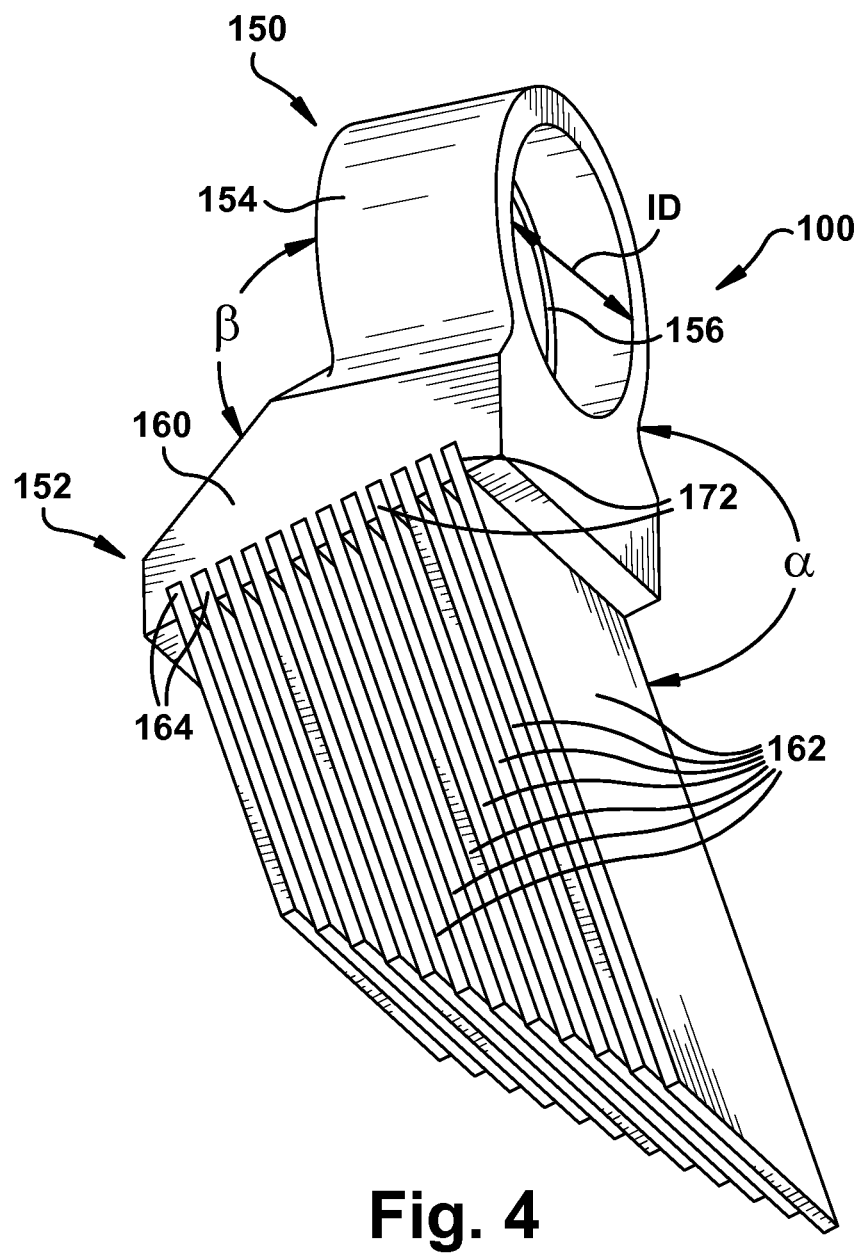
FIG. 4 shows a perspective view of a stator bar clip adapter according to embodiments of the invention.
Figure 5:
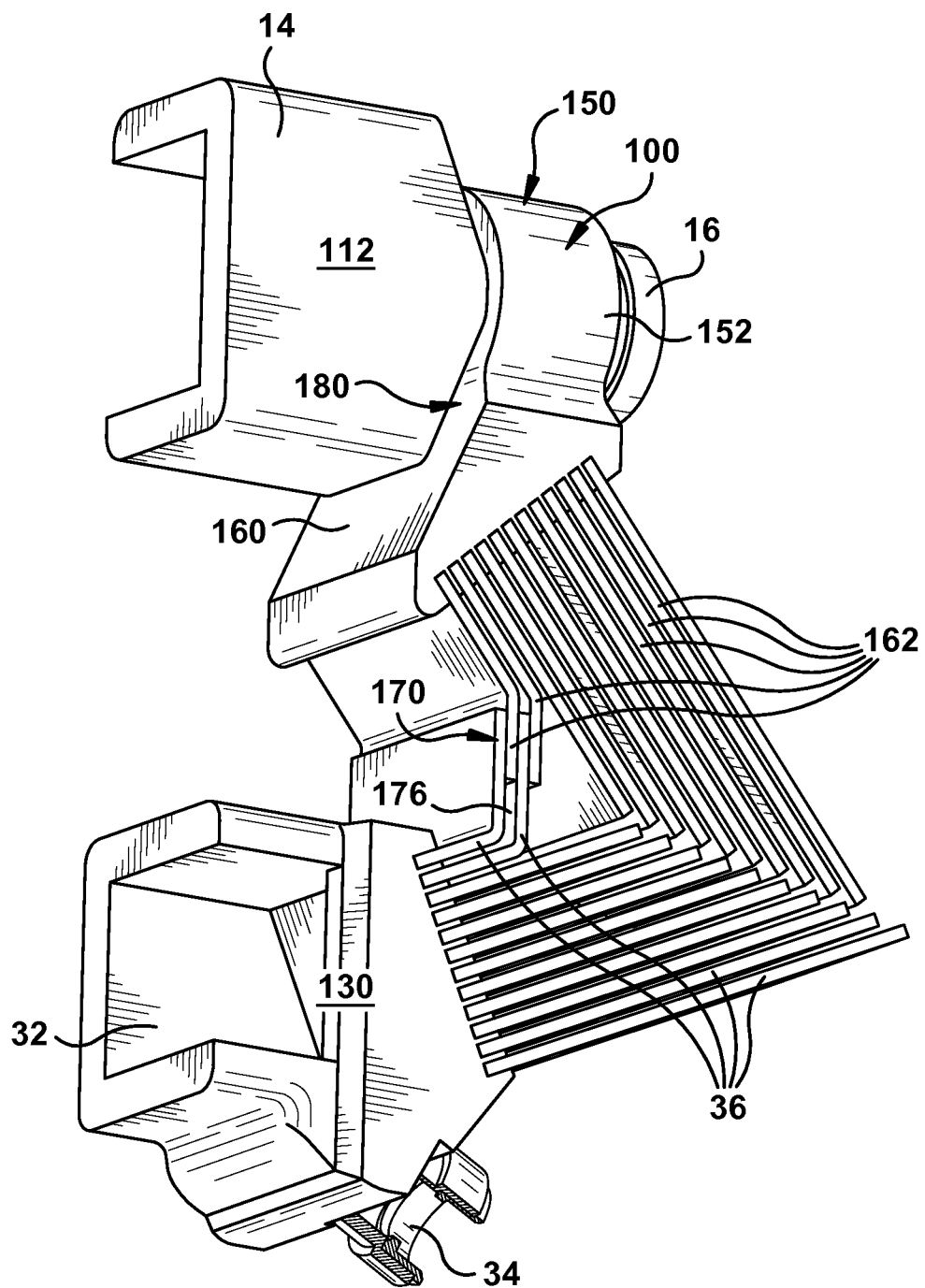
FIG. 5 shows a perspective view of a stator bar clip adapter in a partially installed state in a liquid cooled dynamoelectric device according to embodiments of the invention.
Figure 6:
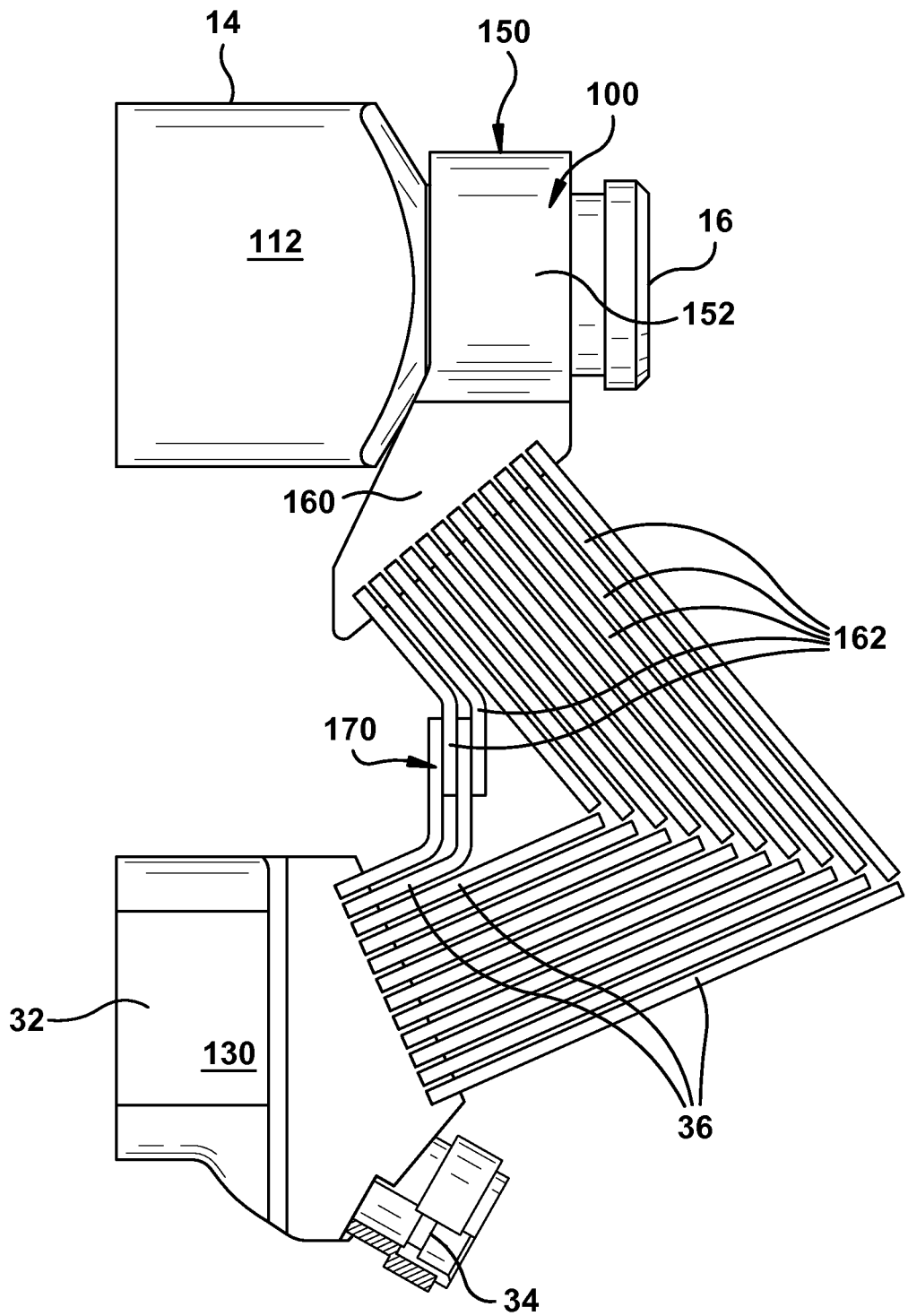
FIG. 6 shows a side view of a stator bar clip adapter in a partially installed state in a liquid cooled dynamoelectric device according to embodiments of the invention.
Figure 7:
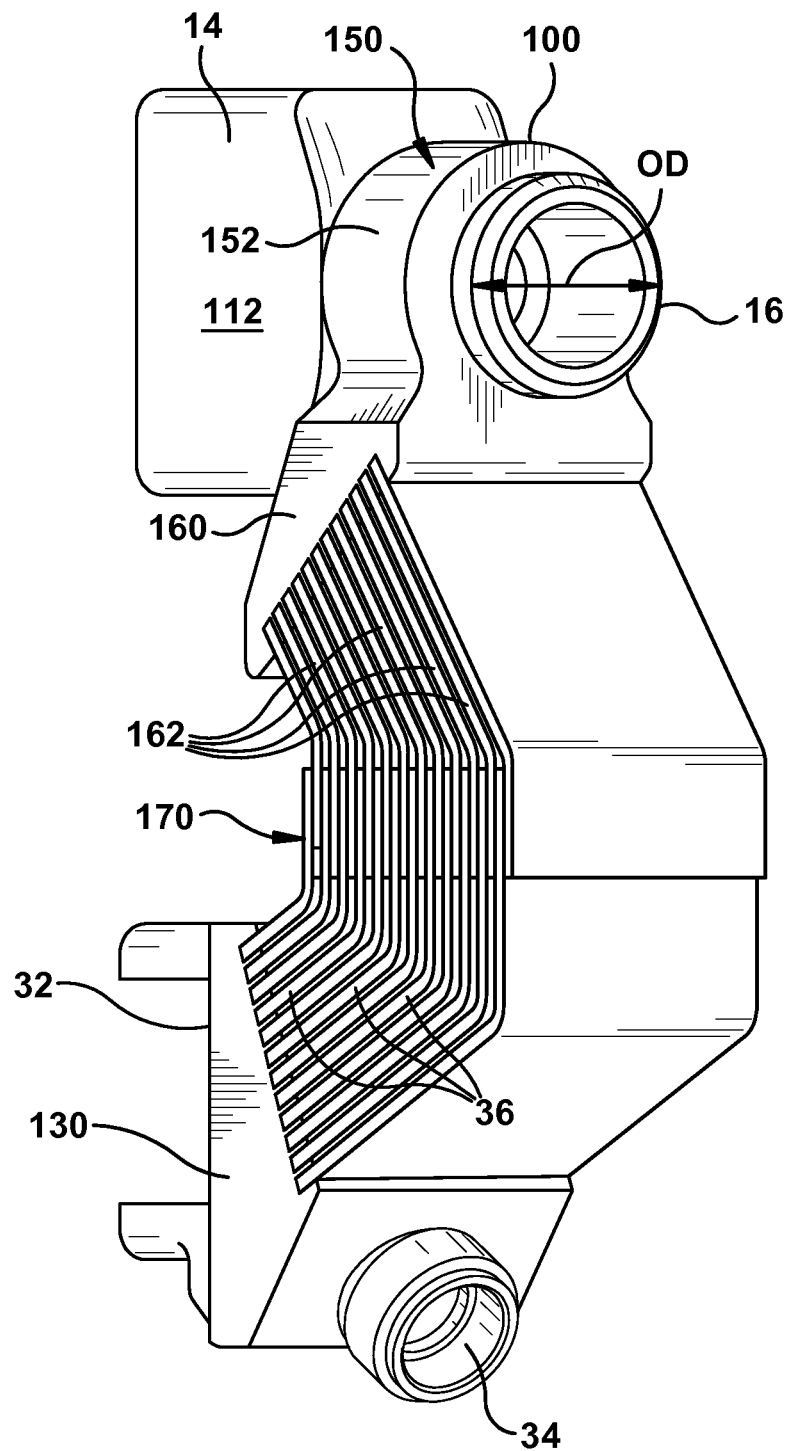
FIG. 7 shows another perspective view of a stator bar clip adapter in an installed state in a liquid cooled dynamoelectric device according to embodiments of the invention.

As shown best in FIG. 4, leaf clip engaging member 152 may include a base 160 coupled to bottle clip engaging member 150, and a plurality of leaf members 162 extending from base 160 and configured for intermeshing engagement with a plurality of leafs 36 (FIGS. 5-7) of stator bar leaf clip 130. Base 160 may be coupled to bottle clip engaging member 150 in any now known or later developed fashion, e.g., machined integrally, welded, brazed, etc. Base 160 includes a plurality of slots 164 structured such that each slot can seat one of plurality of leaf members 162 therein. As shown in FIGS. 5-7, plurality of leaf members 162 are flexible such that they can be bent to intermesh with leafs 36 of stator bar leaf clip 130 when in position on dynamoelectric device 102 (FIG. 3). As illustrated in FIGS. 4-7, plurality of leaf members 162 of leaf clip engaging member 152 have varying lengths configured to seat with spaces 176 (FIGS. 5-7) between plurality of leafs 36 of stator bar leaf clip 130. Leaf members 162 are preferably machined to length, but may be cut to length in the field, where necessary. The intermeshing engagement includes a brazed connection 170 between each leaf member 162 and a respective leaf or leaves 36 of stator bar leaf clip 130. By intermeshing engagement of leaf member 162 and leafs 36 of leaf clip 130, electrical connection can be made between stator bar bottle clip 112 and stator bar leaf clip 130 within device 102, even though they are not of the same type of clip.

Each leaf member 162 may be coupled within a respective seat 164 (FIG. 4) by a brazed connection 172 (FIG. 4) having a reflow temperature greater than the brazed connection used to engage each leaf member 162 to a respective leaf 36 of stator bar leaf clip 130. In this fashion, adapter 100 can be fabricated and used without having leaf members 162 disconnect from base 160 during creation of intermeshing engagement with leafs 36, i.e., using a brazing temperature less than the reflow temperature of the brazed connection between leaf members 162 and base 160. FIGS. 3 and 7 show all of the leaf members 162 intermeshed with leaves 36.

As shown in FIGS. 3 and 5-7, a number of structural interrelations allow for proper connection of adapter 100 with clips 112, 130. First, bottle clip engaging member 150 may extend at an obtuse angle α relative to leaf clip engaging member 152 to allow for proper connection to clips 112, 130, e.g., angled between collar 154 and leaf members 162. The angle α may vary based on the structure of particular device 102 (FIG. 3), e.g., 90°-170°. In addition, base 160 may extend axially toward stator bar 140, 142 relative to collar 154 to position adapter 100 for coupling to clips 112, 130 (see angle β of, e.g., 110°-170°). In addition, collar 154 and/or base 160 may be configured (e.g., shaped, sized, relative position, etc.) to position the plurality of leaf seal members 162 relative to stator bar bottle clip 112 to extend toward plurality of leafs 36 of stator bar leaf clip 130. With regard to base 160 providing this function, base 160 may interact with stator bar coupling portion 14 of stator bar bottle clip 112 such that only one position is possible, i.e., with leaf members 162 substantially aligned with leafs 36. In one embodiment, this functionality can be provided by having base 160 have a shape configured to mate with an outer shape of stator bar bottle clip 112. For example, edges of base 160 may align with edges of stator bar coupling portion 14 of stator bar bottle clip 112 such that only one position is possible. In addition thereto or as an alternative, base 160 could also literally seat or mate in an area 180 (FIG. 5 only) with an exterior surface of bottle clip 112. With regard to collar 154 providing this function, interacting detents or alignment marks on bottle clip 112 and collar 154 can be provided to position the plurality of leaf seal members 162 relative to stator bar bottle clip 112 to extend toward plurality of leafs 36 of stator bar leaf clip 130. Other mechanisms to ensure alignment are also possible.

As shown in FIG. 3, piping 118 fluidly couples port 16 of bottle clips 112 to port 34 of leaf clips 130 to form the necessary cooling liquid connections therebetween. Consequently, adapter 100 allows for electrical and liquid coolant connections between different stator bar clip types within a single device 102 regardless of the original design for the stator bars therein. In addition, adapter 100 allows quick installation of different clips in an urgent situation, e.g., a forced outage of dynamoelectric device 102, allowing for quicker repair where necessary. Repairs using adapter 100 may be necessary, for example, where the particular type of clip that device 102 uses are not available, cannot be replaced after removal, device restart is imperative, etc. Subsequent repairs during a planned outage may replace the different types of clips 112, 130 and adapters 100 to make device 102 uniform and use the clips for which the device was originally designed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A stator bar clip adapter for a liquid cooled dynamoelectric device having a stator bar bottle clip coupled to a first stator bar and a stator bar leaf clip coupled to a second, same series-loop stator bar, the adapter comprising:
   a bottle clip engaging member configured to engage the stator bar bottle clip; and
   a leaf clip engaging member coupled to the bottle clip engaging member and configured to engage the stator bar leaf clip.

2. The stator bar clip adapter of claim 1, wherein the bottle clip engaging member includes a collar having an inner diameter configured for sliding engagement about an outer diameter of the stator bar bottle clip.

3. The stator bar clip adapter of claim 2, wherein the collar is sized such that, in a seated position, the stator bar bottle clip extends through the collar allowing a piping connection to the stator bar bottle clip.

4. The stator bar clip adapter of claim 2, wherein the collar includes a braze ring therein for engaging the outer diameter of the stator bar bottle clip.

5. The stator bar clip adapter of claim 1, wherein the leaf clip engaging member includes:
   a base coupled to the bottle clip engaging member; and
   a plurality of leaf members extending from the base and configured for intermeshing engagement with a plurality of leafs of the stator bar leaf clip.

6. The stator bar clip adapter of claim 5, wherein the plurality of leaf members are flexible.

7. The stator bar clip adapter of claim 5, wherein the base includes a plurality of slots, each slot for seating one of the plurality of leaf members therein.

8. The stator bar clip adapter of claim 7, wherein the intermeshing engagement includes a brazed connection between each leaf member and a respective leaf of the stator bar leaf clip.

9. The stator bar clip adapter of claim 8, wherein each leaf member is coupled within a respective seat by a brazed connection having a reflow temperature greater than the brazed connection used to engage each leaf member to a respective leaf of the stator bar leaf clip.

10. The stator bar clip adapter of claim 5, wherein the plurality of leaf members of the leaf clip engaging member have varying lengths configured to seat with a space between the plurality of leafs of the stator bar leaf clip.

11. The stator bar clip adapter of claim 5, wherein the first stator bar is structured to accommodate a stator bar leaf clip.

12. The stator bar clip adapter of claim 5, wherein the bottle clip engaging member includes a collar having an inner diameter configured for sliding engagement about an outer diameter of the stator bar bottle clip, and wherein the base extends axially toward the stator bar relative to the collar.

13. The stator bar clip adapter of claim 12, wherein the collar is configured to position the plurality of leaf seal members relative to the stator bar bottle clip to extend toward the plurality of leafs of the stator bar leaf clip.

14. The stator bar clip adapter of claim 5, wherein the base has a shape configured to mate with an outer shape of the stator bar bottle clip.

15. The stator bar clip adapter of claim 1, wherein the bottle clip engaging member extends at an obtuse angle relative to the leaf clip engaging member.

16. The stator bar clip adapter of claim 1, wherein each member includes copper.

17. A stator bar clip adapter comprising:
   a bottle clip engaging member including a collar having an inner diameter configured for sliding engagement about an outer diameter of a stator bar bottle clip coupled to a first stator bar; and
   a leaf clip engaging member configured to engage a stator bar leaf clip coupled to a second, same series-loop stator bar, the leaf clip engaging member including:
   a base coupled to the bottle clip engaging member; and
   a plurality of leaf members extending from the base and configured for intermeshing engagement with a plurality of leafs of the stator bar leaf clip.

18. The stator bar clip adapter of claim 17, wherein the base includes a plurality of slots, each slot for seating one of the plurality of leaf members therein.

* * * * *